Nov. 19, 1935.　　　G. S. FROST　　　2,021,597
MACHINE FOR TRIMMING PIES
Filed July 19, 1934　　2 Sheets-Sheet 1
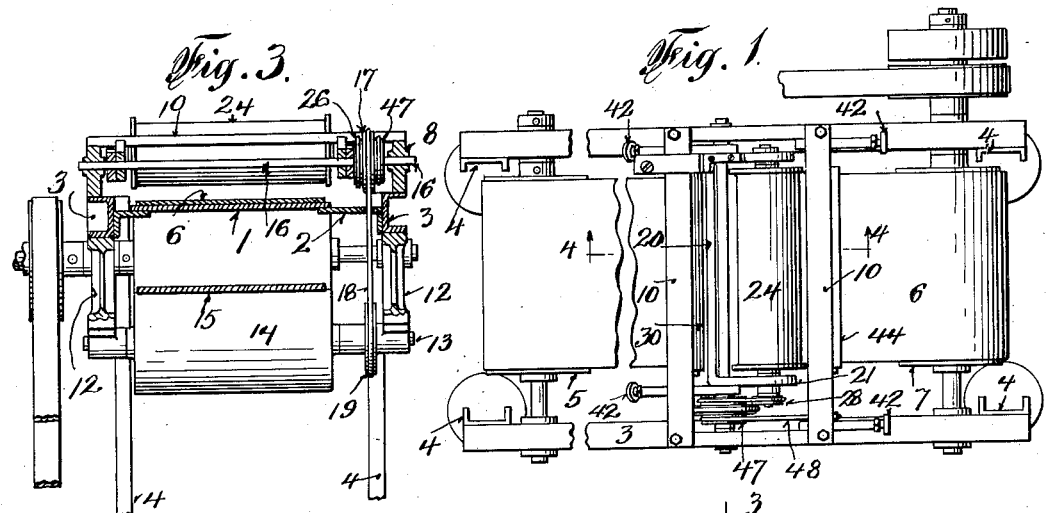
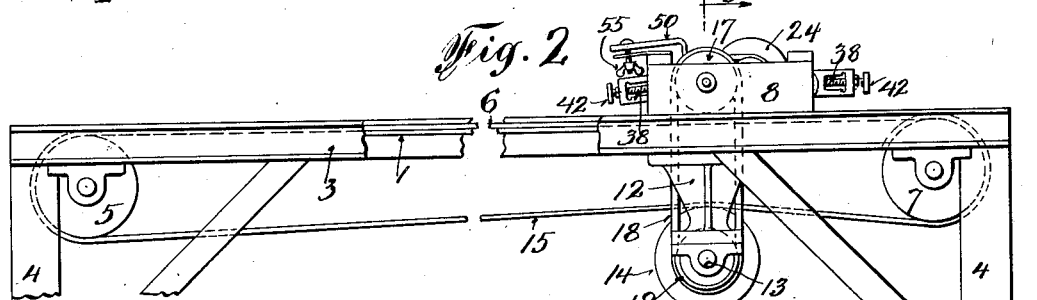
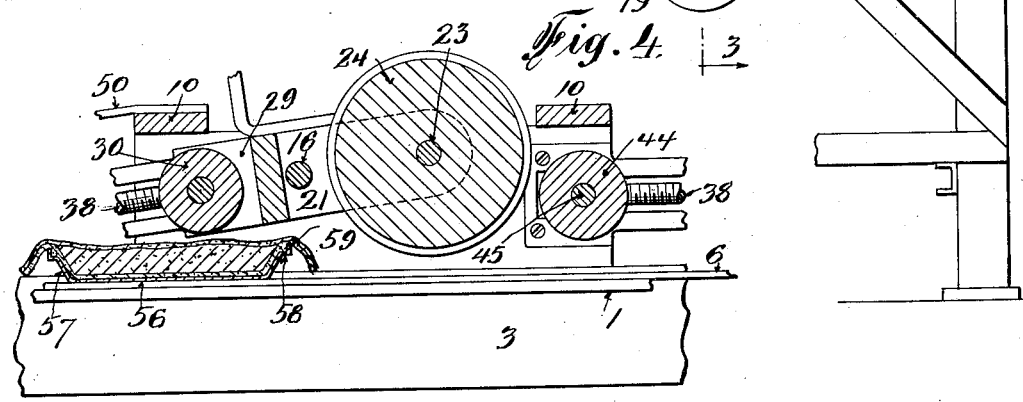
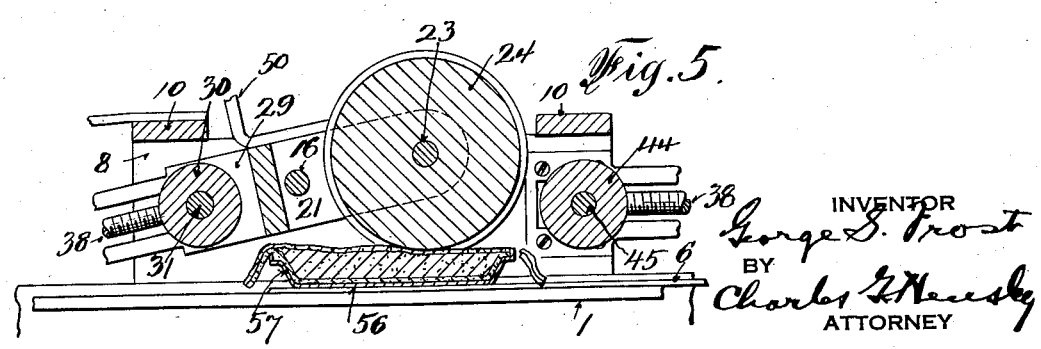
INVENTOR
George S. Frost
BY
Charles G. Hensley
ATTORNEY Nov. 19, 1935.  G. S. FROST  2,021,597
MACHINE FOR TRIMMING PIES
Filed July 19, 1934  2 Sheets-Sheet 2
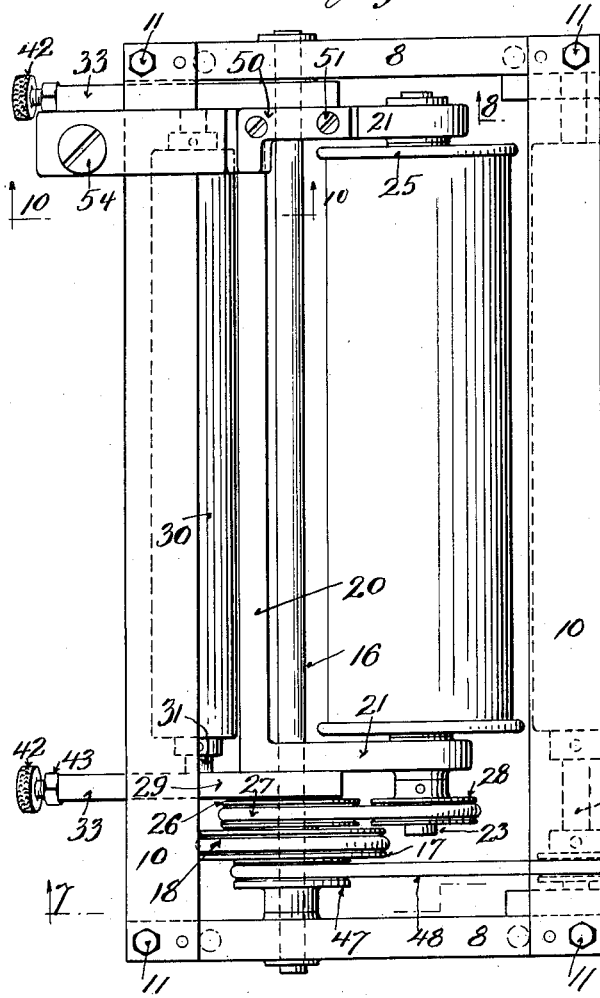
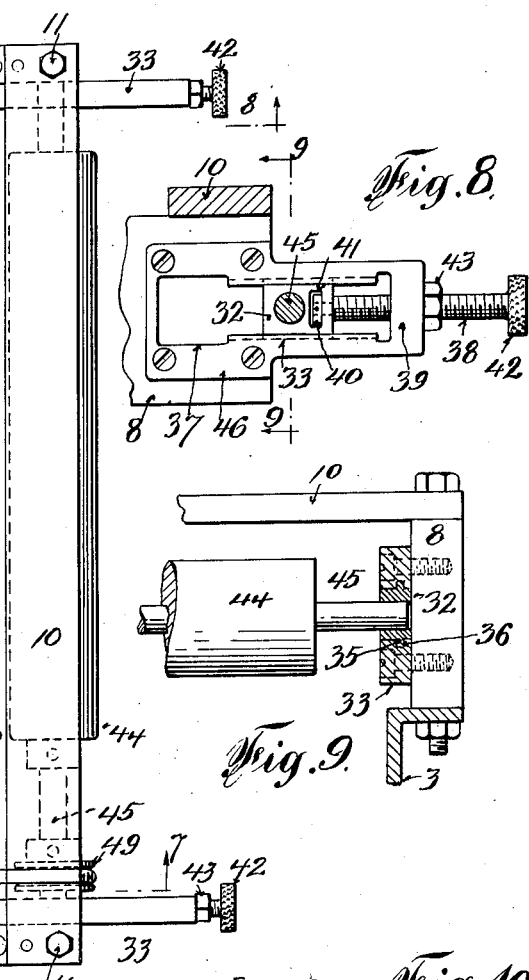
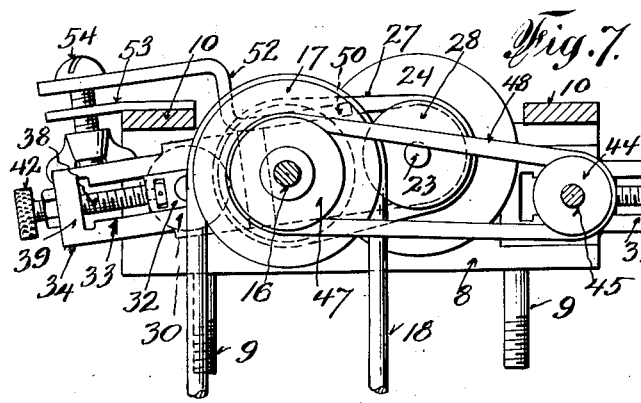
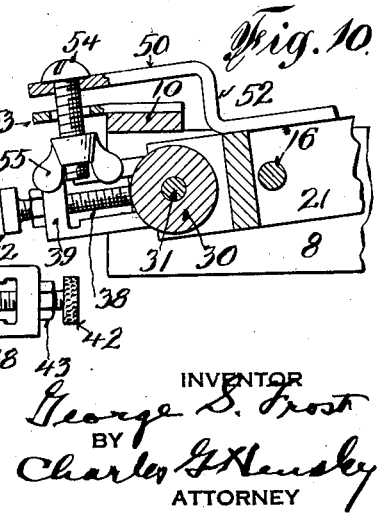
INVENTOR
George S. Frost
BY Charles G. Hensley
ATTORNEY Patented Nov. 19, 1935

2,021,597

UNITED STATES PATENT OFFICE 2,021,597

MACHINE FOR TRIMMING PIES

George S. Frost, Baldwin, N. Y.

Application July 19, 1934, Serial No. 735,919

14 Claims. (Cl. 107—1)

My invention relates to a simple machine for trimming pies, as it is called, which consists of applying pressure to dough which forms the upper or bottom, or both upper and bottom crusts, against the edge of the plate in which the pie is made, for the purpose of removing the excess dough which extends out beyond the edge of the plate.

Heretofore the machine made for trimming pies has been large and cumbersome and has cost between two and three thousand dollars. Aside from the fact that only larger bakeries could afford such a machine, the machine itself occupied considerable space and for these reasons only the very large bakeries could afford to employ such a machine for trimming pies.

The other method of trimming pies was to stand the pie plate on a slightly raised support on which the plate could be turned around easily, an operator would bring the hands down against the edge of the plate to squeeze the dough and thus trim it around the edge of the plate. The plate was turned step by step by the operator as it was necessary to move the hands down against the dough and against the edge of the plate several times to complete the trimming of the dough around the whole plate.

The object of my present invention is to provide a machine of very simple construction and one which is very inexpensive to manufacture and which will trim pies smoothly and regularly at high speed.

The present machine, which is obviously very simple as will appear from the detailed description of its construction, costs but a fraction of the amount that the above referred to machines cost. It takes up but very little space and in fact it may be attached adjacent an ordinary travelling belt used in pie bakeries to convey the pie plates along from one operator to another while the various parts of the pie are being applied to the plate. The present machine may, therefore, be incorporated in any pie bakery where a conveying belt is used as described above, without the present machine taking up any space other than that ordinarily taken up by the belt conveyor.

Another advantage of the present invention is that no holders are necessary to receive pie plates therein as the plates may be regularly or irregularly fed onto the travelling belt in various positions and notwithstanding the irregularity in the position of the plates they will proceed with the belt and be operated on by my present invention. The elimination of the necessity of holders for the individual plates has other advantageous features.

In machines of the type referred to above which are now on the market for trimming pies, there is a long delay and considerable labor involved in the change from operation on, say, ten-inch pies to twelve-inch pies, or any other change from one size pie to another, because the plate holders on the belt or conveyor must be removed and holders of another size applied, together with corresponding changes in the trimming dies. Thus it is necessary to shut down such a machine for considerable periods whenever it is desired to convert the machine from operation on one size pie to another.

With the present invention the machine will operate equally well for any size pie and as between very small and very large pies only slight adjustments have to be made and these are such as can be made in a few minutes' time.

To a certain extent the machine may be fed pies of different sizes at the same time, but where there are extreme differences in the size of the pies it is preferable that the slight adjustments referred to be made. Instead, however, of the machine having to be shut down for a considerable period while preparation is made to shift from operation on one size pie to another, adjustment may be made in the present case almost instantly. This makes it possible to shift from one size pie to another as often as the demands of the business may require. For instance, the machine may be run for very small pies for an hour or so and then it may be momentarily stopped and adjusted for relatively large pies; then again the machine may be changed back to the small or any other size pie, so that in the course of a day several sizes of pies may be handled by the machine with practically a negligible delay of a few minutes in making the change. This is a decided advantage in a pie bakery.

Because of the compactness of the present machine, its low cost and other features, it becomes possible for smaller bakeries to use my machine for trimming pies where otherwise small bakeries had to depend on hand trimming operations.

In prior machines there was not only a considerable loss of time when shifting from one size pie to another, but the bakery possessing such a machine had to spend large sums of money in order to have a set of plate holders for each different size pie and also a set of trimming dies for each size pie plate, and this expense ran into hundreds of dollars over and above the bare cost of the machine itself. These disadvantages are all eliminated in my present machine.

Other advantages of the present invention will be set forth in the following detailed description of my invention. While the machine as a whole may be constructed entire to embody my invention, it is possible to utilize the ordinary work bench with travelling belt commonly used in bakeries where pies are trimmed by hand.

In the drawings forming part of this application,

Figure 1 is a plan view of a machine embodying my invention,

Figure 2 is a side elevation thereof,

Figure 3 is a sectional view taken on the line 3—3 of Figure 2,

Figure 4 is a sectional view taken on the line 4—4 of Figure 1 but on an enlarged scale, Figure 5 is a similar view showing the parts in the condition when the trimming roller is operating on a pie, Figure 6 is an enlarged plan view of a roller device for trimming the pies, Figure 7 is a sectional view taken on the line 7—7 of Figure 6, Figure 8 is a sectional view taken on the line 8—8 of Figure 6, Figure 9 is a detail sectional view showing the mounting of one of the rollers in its bearing, and Figure 10 is a sectional view taken on the line 10—10 of Figure 6.

My invention may be embodied in a machine built especially for the purposes herein set forth, but as already indicated, it is possible to utilize the ordinary work bench with travelling belt, such as is commonly used in bakeries to transport the pies from one workman to another where the pies are made by hand; and in the drawings I have shown such a bench and belt utilized as part of the combination. The function of the travelling belt is to convey the pie plates with the dough placed thereon, past the trimming device.

The operators who supply the dough for the lower crust, and the operator for supplying the filler, and the operator for supplying the dough for the top crust, may all work along side of the bench and when the pie plates with the various parts of the pie thereon travel beyond the last operator, that is the one who applies the dough for the top crust, the pie plates then travel under my automatic trimming device and the latter trims the excess dough around the edge of the plate, so that the plate with the unbaked pie thereon is ready to be delivered into the baking oven.

In the drawings I have shown an ordinary work bench 1 supported on angle plates 2 which latter are secured to the channel beams 3 which form the longitudinal structural members of the bench. These channel beams are connected with and are supported by suitable legs 4 disposed at opposite ends of the work bench and sometimes duplicated at intervals between the ends of the bench.

At the receiving end of the work bench there is a pulley 5 around which engages an endless belt 6 and this belt also travels around the pulley 7 adjacent the delivery end of the bench. The upper run of this belt rests upon and travels along the top of the table 1 and on this run of the belt the pie plates are deposited at the left hand end of the machine in Figure 2, so that the plates travel from left to right in this view until the pie materials have been supplied to the plates and the dough has been trimmed in the manner hereinafter described, so that by the time the pie plates reach the right hand end of the machine in Figure 2, they will be supplied with all the materials necessary to constitute a pie and will be ready to be inserted in an oven (not shown) where the pie is to be baked.

If the bakery is not supplied with a work bench having a travelling belt, as described herein, then the machine may be built up to include the work bench and travelling belt, in which case it may be constructed and arranged as shown in the drawings.

When the pie plates are deposited on the travelling belt at the left hand end of the machine as viewed in Figure 2, one operator will place a sheet of rolled dough a little larger than the plate, upon the latter, and as the plate progresses with the belt it reaches another operator who pours the filling material in on the bottom dough; then as the plate progresses further with the belt, another operator will place another sheet of rolled dough, somewhat larger than the plate, across the top of the plate and filler. This will leave a double thickness of dough hanging over the edge of the plate.

Another operator may be employed to mark the top dough with a suitable die to indicate the kind of pie. In some instances two operators may be employed for placing the top dough on the plates in order to keep up with the speed of the machine, and in some cases more than one operator will be employed to place the fillers in the plates, but this is all in accordance with present practice in making pies by hand. Regardless of what steps may be employed in putting the parts of the pie in the plate, my present invention is adapted to trim the excess dough from the rim of the plate.

I have shown the trimming device assembled upon a frame of rectangular shape composed of the end members 8 which are adapted to rest upon the longitudinal channel beam 3 of the frame of the machine and to be held in place by means of bolts 9 extending downwardly from the end members 8 and passing through apertures in the channel beam to be secured by suitable nuts applied to the ends of the bolts 9.

The frame of the trimming device also includes cross members 10 attached at their ends to the end members 8 by means of bolts 11 securing the several frame members rigidly together. This frame is preferably detachably mounted on the frame of the work bench in the manner described, so that the rollers carried by this frame will be over the path of the travelling belt on which the pies and pie plates are conveyed.

I prefer to take the driving force for operating the trimming rollers from the travelling belt 6 in order that the trimming device will be properly synchronized with the belt and also because of the simplicity of construction. There is a pair of brackets 12 attached at the upper ends to the channel beams 3 and depending therefrom to form bearings for a cross shaft 13 on which is mounted a pulley 14. The latter engages the under surface of the lower run 15 of the travelling belt and by frictional contact therewith this pulley is driven from the belt and the power for the trimming device is conveyed from the shaft 13 to the rollers of the trimming device.

There is journaled in the end members of the trimming frame a cross shaft 16 on which several pulleys are disposed adjacent one end of the shaft. One of these pulleys 17 is engaged by a round belt 18 travelling in the groove of the pulley and this belt is endless and it also travels around the grooved pulley 19 which is mounted on the shaft 13 which carries the pulley 14. Through the parts just described the operating force is transmitted from the belt 15 to the shaft 16 of the trimming device.

There is a rocking frame mounted on the stationary frame of the trimming device and it consists of a yoke shaped frame 20 having two parallel arms 21; and this frame has apertures in each of the arms 21 to receive the shaft 16 therethrough so that the movable frame is adapted to rock freely on the shaft 16.

The outer or free ends of the frame members 21 have bearings in which the shaft 23 is journaled and this shaft carries the larger roller 24 which is the roller that actually trims the pies. I have shown flanges 25 on each end of this roller to prevent the pie plates from moving sidewise out of engagement with the trimming roller. This trimming roller is driven at the same surface speed as the conveying belt 6 preferably in the following manner. There is journaled on the cross shaft 16 a pulley 26 which is secured to the pulley 17 to travel in unison therewith, and there is an endless belt 27 engaging in the groove of the pulley 26 and also engaging in the groove of a pulley 28 which is fixed on one end of the shaft 23 which is the shaft of the trimming roller. Through these connections the power derived from the conveyor belt is transmitted to the trimming roller so that the latter is revolved at about the same surface speed as the conveying belt and the adjacent surface of the roller travels in the same direction as the adjacent run of the conveyor belt. For instance, viewing the parts as in Figure 4, the conveying belt is moving to the right and the trimming roller is moving counter-clockwise.

The rocking frame, in addition to the parts described above, also includes the arms 29 extending to the left of the shaft 16 in Figure 6 and on these arms there is carried a roller 30 which lies parallel to the trimming roller and which is preferably of smaller diameter than the latter. The shaft 31 of this roller is mounted at opposite ends in bearing blocks 32 similar to the one shown in Figure 8. These bearing blocks 32 are slidable between the opposing guide members 33 which are formed as part of the bracket 34 which is formed on the arms 29.

The sliding blocks have flanges 35 which fit the corresponding grooves 36 in the members 33 so that the bearing blocks may slide along these members but will not withdraw therefrom unless the bearing blocks are moved into the relatively large opening 37 at one end of the bracket 34. This is done only when the parts are to be disassembled. When the bearing blocks are in use they remain in some position along the members 33.

There is a screw 38 threaded through the end member 39 of the bracket 33 and this screw on one end has a projecting flange or head 40 which extends through an aperture 41 of the bearing block so that the latter will travel or be slid along by the screw 38. The opposite end of the screw 38 is provided with a knurled head 42 adapted to be engaged by the fingers for the purpose of turning the screw to the right or left in Figure 8 for the purpose of adjusting the position of the bearing block 32. There is a lock nut 43 on this screw which is adapted to be screwed against the end member 39 of the bracket for the purpose of locking the screw after it has been adjusted. There is a bearing block for each end of the shaft 31 of the roller 30 and as they are both alike and the means for adjusting them are both alike, the description applies to both.

It will be apparent from what has just been described that the roller 30 may be adjusted toward and from the trimming roller 24 for a purpose which will be set forth hereinafter. It will be apparent that the trimming roller and the guide roller 30 are both mounted on the rocking frame but on opposite sides of the pivotal line, which is the shaft 16 so that when the trimming roller swings upwardly the guide roller 30 swings downwardly and vice versa, although the guide roller in the position shown in Figure 6, being nearer the axis, i. e., center of the shaft 16, its movement will be relatively less than the movement of the trimming roller.

There is another guide roller 44 disposed on the opposite side of the trimming roller to that of the roller 30 and it is also mounted to be adjustable toward and from the trimming roller but instead of being mounted on a movable frame, this guide roller is mounted on the stationary frame of the trimming device. The shaft 45 of this roller is mounted at each end in an adjustable device like that shown in Figure 8 and which has just been described in connection with the roller 30. In other words, the ends of the shaft 45 are each mounted in a slide block 32 as shown in Figure 8 and the position of this roller may be adjusted by turning the screws 38 in exactly the same manner as the roller 30 is adjustable. The difference, however, between this roller 44 and the guide roller 30 is that the brackets 46 in which the bearing blocks are mounted are attached to the end members 8 of the stationary frame of the device so that the roller 44 may be adjusted toward and from the trimming roller but it has no up and down motion such as the trimming roller and the guiding roller 30 partake of.

While the first guide roller 30 is shown as an idler, I prefer to drive the second or after guide roller 44. For this purpose I have mounted another pulley 47 on the shaft 16 and connected with the pulley 17 to move therewith. There is an endless belt 48 travelling in the groove of the pulley 47 and this belt also travels in the groove of the pulley 49 on the shaft 45 of the roller 44. Through the parts just described, the operating force taken from the conveying belt 6 and transmitted to the pulley 17 is by means of the pulleys 47 and 49 and the belt 48 transmitted to the guide roller 44 so that the latter will assist in propelling the plates with the conveyor belt in addition to performing the function hereinafter described.

It is not intended that the guide roller 30 should come into contact with the dough on the pie plates unless the latter should be tilted or tipped, as otherwise this roller would have a tendency to trim the dough, whereas it is the intention that the larger roller 24 shall perform this operation. I therefore provide means for adjusting the lower position of the guide roller 30 and it consists of the following:

There is a bracket 50 secured by the screws 51 to the top of the rocking frame. This bracket is bent upwardly at 52 and thence backwardly in a more or less horizontal direction, so that it overlies the bracket 53 which is secured upon one of the cross members 18 of the stationary frame. There is a screw 54 threaded through the bracket 50 and passing loosely through an aperture in the stationary bracket 53. The head of this screw rests against the top of the bracket 50 and below the bracket 53 this screw is provided with a wing nut 55 which is adapted to be turned to different positions along the screw 54. This nut is so adjusted that the rocking frame can tilt so that the trimming roller 24 will rest down on the upper edge of any given size plate which is being supplied to the machine, but the wing nut will prevent, when properly adjusted, the trimming roller from moving so near to the travelling belt as to abut the ends of the pie plates and thereby arrest their movement. The bracket 50 may swing downwardly when the trimming roller rises and the guide roller 30 moves downwardly but this rocking action of the frame is limited so that the guide roller 30 will not quite touch the top of the pie plates travelling with the conveyor belt.

It is necessary, in the operation of my machine, to use a pie plate having a vertical or upstanding outer edge.

For this purpose I have shown a pie plate having a bottom wall 56 surrounded by inclined walls 57 and at the upper edge of the latter there is a horizontal extension 58 followed by a vertical flange 59 so that the extreme top edge of this flange forms an upwardly directed edge with which the trimming roller is adapted to co-operate. If the plates are of rectangular shape, they may be placed on the belt so that they approach the trimming roller in a diagonal position.

Operation

It may be assumed that the machine is set to trim very small pies. The rollers 30 and 44 will both be adjusted to their nearest positions to the trimming roller 24. Before the pie plate travels under the trimming roller the parts will be in the position indicated in Figure 4, that is to say, the rocking frame will be in such position that the distance between the travelling belt 6 and the bottom of the trimming roller 24 will be slightly less than the height of a pie plate with the parts of a pie thereon, but the distance between the guide roller 30 and the travelling belt will be greater than the height of the pie plate and the parts of the pie thereon. This initial position of the two rollers will be determined by the adjustment of the wing nut 55. If the trimming roller is allowed to go down much below this position it might block the travelling pie plates.

Assuming the pie plate with the parts of the pie therein travels along on the belt 6, as shown in Figure 4, it will move into engagement with the trimming roller and as the latter is floating, that is, it is connected with the swinging frame, the trimming roller will be slightly raised as the pie plate begins to pass under it, whereupon the weight of the trimming roller will cause it to press down on the top of the pie plate and particularly against the top edge of the flange 59 so that as the pie plate progresses under this roller, as shown in Figure 5, all of the dough which projects over the edge 59 of the pie plate will be trimmed off by reason of the action of the trimming roller resting on this edge of the plate.

In Figure 5 the plate has progressed partly under the roller so that part of the overhanging dough has been cut or trimmed. The plate progresses with the travelling belt, its progress being facilitated by reason of the fact that the trimming roller is driven in the direction necessary to assist the pie plate in passing under it. When the pie plate has traveled entirely under the trimming roller and emerges at the right hand side thereof in Figure 5, all the dough projecting beyond the edge of the plate will have been trimmed off and the plate, together with the parts of the pie will then be ready to be removed from the belt and placed in an oven in which the pie is to be baked.

The pieces of dough which are trimmed from the pie and which fall on the travelling belt may be removed by hand or automatically scraped off by suitable scrapers (not shown).

It will be noted that when the pie plate starts to move under the trimming roller it lifts the latter slightly and causes the rocking frame to be tilted a slight extent and this action causes the guide roller 30 to be moved down near the top edge of the pie plate, but it does not come into actual contact with the plate unless at the time the forward part of the plate starts under the trimming roller the plate is slightly rocked on the belt, then, in that case, the guide roller 30 will limit the tilting of the plate so that the trimming roller will lie on the top edge of the plate and the plate will not be turned over. However, it is not intended that the roller 30 perform the trimming operation.

As the pie plate emerges at the right hand side of the trimming roller in Figures 4 and 5 there may be a tendency for the trimming roller, because of its floating action and its downward pressure on the pie plate, to tip the latter about the time the trimming roller reaches the back edge or corner of the pie plate.

However, by this time the forward edge of the pie plate will have begun to travel under the guide roller 44 so that if the plate is tilted or rocked upwardly at its forward end the plate will be prevented from tipping over or tipping at a high angle by the guide roller 44. This roller is normally above the top edge of the pie plate when the latter is flat on the travelling belt so that it does not make contact with the pie plate unless the latter tilts as it is about to leave the trimming roller.

After the entire plate has passed under the trimming roller, all of the dough projecting over all portions of the edge of the plate will have been trimmed around the edge of the flange 59, thus separating this dough from the part which lies on the plate and which is to be part of the finished pie.

It is preferable that the distance between the horizontal portion 58 of the pie plate and the top edge of the flange 59 be about the combined thickness of the upper and lower sheets of dough. After the pie plate has passed beyond the trimming roller the latter will drop slightly into the position shown in Figure 4 and the pie plate with the parts of the pie thereon will continue to move to the right on the travelling belt 6 and it may be removed from the latter by hand or by any automatic scraper (not shown). When one pie plate has passed under the trimming roller and the latter rocks back into the position shown in Figure 4, it remains in this position until another pie plate approaches it on the travelling belt, whereupon the operations described above will be repeated. It is possible for two or more plates of a small size, lying side by side, to pass under the trimming roller at the same time, in which case the trimming roller will operate simultaneously to trim the dough from both plates.

If larger plates than those shown in the drawings and containing larger pies are to be fed to the machine, it is preferable to operate the several heads 42 of the several adjusting screws for the purpose of moving the guide roller 30 further away or to the left of the trimming roller than the position shown in the drawings, and it is also preferable to move the guide roller 44 to the right and further away from the trimming roller for the larger size plates. This is done in order that the rear portion only of the pie plate will be under the roller 30 when the forward part of the plate makes contact with the trimming roller. The new position of the roller 44 causes this roller to be in position to engage the plate only if the plate is tilted or rocked when the last portion of it is moving under the trimming roller.

The adjustment of the two rollers 30 and 44 is the only change to be made in the machine when changing from one size of pie to another, except that the wing nut 55 may require adjustment when shifting from pie plates of one height to pie plates of another height, in order to have the lower position of the roller 30 just above the pie plate and the dough.

From the above it will be apparent that the pies are automatically trimmed by the floating trimming roller as they are propelled along on the top run of the belt 6. The machine does even better work than can be accomplished by hand trimming, but the operation is much faster. No matter how many operators are employed in a crew for applying two sheets of dough and filler to the plates, the trimming device is capable of trimming the pies of any crew operating in connection with a single conveyor belt.

If at any time it is desired to return to hand trimming the frame of the trimming device and the parts associated with it may be detached from the frame of the bench device, whereupon the conveyor belt may be used without the automatic trimming device.

Various changes in the construction and operation of the device may be made without departing from the broad features of my invention. As far as I know I am the first to eliminate plate holders and dies in a machine for trimming pies. Furthermore, as far as I know I am the first to use a floating roller co-operating with the edge of the pie plate to trim the dough around the same.

Having described my invention, what I claim is:

1. A pie trimming machine including a travelling conveyor for conveying pie plates thereon having pie material on said plates, including a roller and means for mounting the same so that said roller has a floating up and down movement from and toward the path of the plates, said roller being mounted parallel to the plane of movement of the plates and with its axis at right angles to the direction of travel of the plates, said roller adapted to act on the top edges of the plates to trim the dough.

2. A pie trimming machine including a travelling conveyor for conveying pie plates thereon having pie material on said plates and means adjacent the path of the plates on said conveyor, including a cylindrical roller and means for mounting the same so that said roller has a floating up and down movement from and toward the path of the plates, said roller being mounted parallel with the plane of movement of the plates and with its axis at right angles to the direction of travel of the plates, said roller adapted to act on the top edges of the plates to trim the dough.

3. A pie trimming machine including a travelling conveyor belt for conveying pie plates thereon having pie material on said plates, means adjacent the path of the plates on said conveyor including a cylindrical roller and means for mounting the same so that said roller has a floating up and down movement from and toward the path of plates, said roller being mounted parallel to the plane of movement of the plates and with its axis at right angles to the direction of travel of the plates, said roller adapted to act on the top edges of the plates to trim the dough.

4. A pie trimming apparatus including means for conveying pie plates having pie material thereon, and means adjacent the path of the plates and including a floating roller adapted to press on the top edges of the pie plates while they are being conveyed past the same, for the purpose of trimming excess dough around the edges of the plates, and restraining means so disposed as to be normally out of contact with the plates but so positioned that if the plate is tilted by said trimming roller, said means will act on the rear portion of the plate to limit the tilting of the plate.

5. A pie trimming apparatus including means for conveying pie plates having pie material thereon, and means adjacent the path of the plates and including a floating roller adapted to press on the top edges of the pie plates while they are being conveyed past the same, for the purpose of trimming excess dough around the edges of the plates, and restraining means including a roller disposed to limit the tilting of the rear portion of the plate while the forward portion thereof is engaged by the trimming roller.

6. A pie trimming apparatus including means for conveying pie plates having pie material thereon, and means adjacent the path of the plates and including a rocking frame, a trimming roller mounted thereon and adapted to press on the top edges of the pie plates while they are being conveyed past the same, for the purpose of trimming excess dough around the edges of the plates, and a restraining roller carried by said rocking frame and disposed to limit the upward tilting of the rear portion of the plate while the forward portion thereof is engaged by the trimming roller.

7. A pie trimming apparatus including means for conveying pie plates having pie material thereon, and means adjacent the path of the plates and including a floating roller adapted to press on the top edges of the pie plates while they are being conveyed past the same, for the purpose of trimming excess dough around the edges of the plates, and restraining means disposed in advance of said trimming roller and positioned to act directly over said plate to limit the upward tilting of the forward portion of the plate while the rear portion is engaged by the trimming roller.

8. A pie trimming apparatus including means for conveying pie plates having pie material thereon, and means adjacent the path of the plates and including a floating roller adapted to press on the top edges of the pie plates while they are being conveyed past the same, for the purpose of trimming excess dough around the edges of the plates, and a restraining roller disposed in advance of said trimming roller and arranged to limit the upward tilting of the forward portion of the plate while the rearward portion thereof is engaged by the trimming roller, and means for revolving said trimming roller and said restraining roller.

9. A pie trimming apparatus including means for conveying pie plates having pie material thereon, and means adjacent the path of the plates and including a floating roller adapted to press on the top edges of the pie plates while they are being conveyed past the same, for the purpose of trimming excess dough around the edges of the plates, and a restraining roller disposed in advance of the trimming roller and arranged to be free of the plate while the latter remains flat on the conveying means, but sufficiently close to the plate to limit the upward tilting of the forward portion of the plate while the trimming roller is resting on the rear portion of the plate.

10. A pie trimming apparatus including means for conveying pie plates having pie material thereon, and means adjacent the path of the plates and including a floating roller adapted to press on the top edges of the pie plates, while they are being conveyed past the same, for the purpose of trimming excess dough around the edges of the plates, a roller arranged behind said trimming roller and disposed in position to limit the upward tilting of the rear portion of the plate while the trimming roller is resting on the forward portion of the plate, and another roller disposed in advance of the trimming roller and so positioned as to prevent excessive upward tilting of the forward portion of the plate while the trimming roller is resting on the rearward portion of the plate.

11. A pie trimming apparatus including means for conveying pie plates having pie material thereon and means adjacent the path of the plates including a stationary frame, a rocking frame mounted thereon, a roller carried by said rocking frame and adapted to press on the top edges of the plates while they are being conveyed past the same, for the purpose of trimming excess dough around the edges of the plates, and means for limiting the rocking motion of said rocking frame to limit the downward motion of said trimming roller to prevent the latter from blocking the travel of the plates on said conveying means.

12. A pie trimming apparatus including means for conveying pie plates having pie material thereon and means adjacent the path of the plates including a stationary frame, a rocking frame mounted on said stationary frame, a roller carried by said rocking frame and adapted to roll on the top edges of the pie plates while they are being conveyed past the same for the purpose of trimming excess dough around the edges of the plate, a restraining roller mounted on said rocking frame and arranged to limit the upward tilting of the rear portion of the plate while the trimming roller is resting on the forward portion of the plate, and adjustable means for limiting the rocking of said rocking frame to control the lowermost position of said trimming roller.

13. A pie trimming apparatus including means for conveying pie plates having pie material thereon, and means adjacent the path of the plates and including a floating roller adapted to roll on the top edges of the pie plates while they are being conveyed past the same for the purpose of trimming excess dough around the edges of the plates, a roller arranged behind and parallel to said trimming roller and disposed in position to limit the upward tilting of the rear portion of the plate while the trimming roller is resting on the forward portion of the plate, another roller disposed in advance of the cutting roller and so positioned as to prevent excessive upward tilting of the forward portion of the plate while the trimming roller is resting on the rearward portion of the plate, and means for adjusting the positions of said second and third rollers toward and from the trimming roller to accommodate the device to different size plates.

14. A pie trimming apparatus including means for conveying pie plates having pie material thereon, including a stationary frame disposed adjacent the path of the plates, a shaft journaled in said stationary frame, a rocking frame pivotally mounted on said shaft, a roller carried by said rocking frame and arranged to roll on the top edges of the plates while they are being conveyed past the same to trim excess dough around the edges of the plates, a second roller journaled in said rocking frame on the opposite side of said shaft to said trimming roller, said second roller being positioned to limit the tilting of the rear portion of the plate while the trimming roller is resting on the forward portion of the plate, a third roller disposed beyond said trimming roller and positioned to prevent excessive tilting of the forward portion of the plate while the trimming roller is resting on the rear portion of the plate, pulleys disposed on said shaft and means for operating the same from said conveying means, a pulley on the shaft of said trimming roller and a belt engaging said last mentioned pulleys to cause the operation of said trimming roller, a pulley on the shaft of said third mentioned roller and a belt engaging said last mentioned pulley and one of the pulleys on said first shaft, for causing the operation of said third roller.

GEORGE S. FROST.